US009088164B2

(12) United States Patent
Shim

(10) Patent No.: US 9,088,164 B2
(45) Date of Patent: Jul. 21, 2015

(54) BATTERY SYSTEM, CONTROLLING METHOD OF THE SAME, AND POWER STORAGE SYSTEM INCLUDING THE BATTERY PACK

(75) Inventor: Kyung-Sub Shim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 371 days.

(21) Appl. No.: 13/594,210

(22) Filed: Aug. 24, 2012

(65) Prior Publication Data

US 2013/0207616 A1 Aug. 15, 2013

(30) Foreign Application Priority Data

Feb. 9, 2012 (KR) .................. 10-2012-0013325

(51) Int. Cl.
*H02J 7/00* (2006.01)
(52) U.S. Cl.
CPC .................... *H02J 7/0019* (2013.01)
(58) Field of Classification Search
CPC .. H02J 7/0019; H02J 7/0014; Y02T 10/7044; Y02T 10/7061; B60L 11/1861; B60L 11/1866; B60L 11/1868
USPC ................... 320/116, 118, 120, 136
See application file for complete search history.

(56) References Cited

U.S. PATENT DOCUMENTS

| 3,999,078 A * | 12/1976 | Udvardi-Lakos ............... 307/66 |
| 4,098,961 A * | 7/1978 | Sabatino .......................... 429/48 |
| 2007/0090799 A1 | 4/2007 | Lee et al. |
| 2008/0252257 A1* | 10/2008 | Sufrin-Disler et al. ....... 320/118 |
| 2010/0033128 A1* | 2/2010 | Densham et al. ............. 320/116 |
| 2010/0207579 A1* | 8/2010 | Lee et al. ..................... 320/120 |
| 2012/0161708 A1* | 6/2012 | Miura et al. .................. 320/118 |

FOREIGN PATENT DOCUMENTS

| JP | 2009-005507 | 1/2009 |
| KR | 10-2002-0027019 | 4/2002 |
| KR | 10-0831160 | 5/2008 |
| KR | 10-0858191 | 9/2008 |

* cited by examiner

*Primary Examiner* — Vuthe Siek
(74) *Attorney, Agent, or Firm* — Robert E. Bushnell, Esq.

(57) ABSTRACT

A battery system, a method of controlling the battery system, and an energy storage system including the battery system are disclosed. The method of controlling the battery system includes steps of selecting one of the plurality of batteries by using a multiplexer; measuring a voltage of the selected battery; and calculating a charging capacity of the battery based on the measured voltage. Accordingly, cell balancing may be efficiently performed.

14 Claims, 6 Drawing Sheets

BATTERY SYSTEM, CONTROLLING METHOD OF THE SAME, AND POWER STORAGE SYSTEM INCLUDING THE BATTERY PACK

CLAIM OF PRIORITY

This application makes reference to, incorporates the same herein, and claims all benefits accruing under 35 U.S.C. §119 from an application earlier filed in the Korean Intellectual Property Office on 9 Feb. 2012 and there duly assigned Serial No. 10-2012-0013325.

BACKGROUND OF THE INVENTION

1. Field of the Invention

One or more embodiments of the present invention relate to a battery system, a method of controlling the battery system, and an energy storage system including the battery system, and more particularly, to a battery system capable of efficiently performing cell balancing, a method of controlling the battery system, and an energy storage system including the battery system.

2. Description of the Related Art

In order to solve the problems, such as environmental contamination and resource exhaustion, interest in developing systems which may store energy and efficiently use the stored energy increases. Interest in developing renewable energy that does not cause pollution in the environment during power generation also increases. Therefore, research on energy storage systems, which may be used with renewable energy, on a power storage battery system, and on existing grid power, has been actively conducted in order to minimize the environmental contamination.

Efficient management of batteries used in the energy storage systems is one of the most important aspects to improve the efficiency of the energy storage systems. In the energy storage systems, batteries may be controlled in regard to various features such as charging, discharging, or cell balancing. By efficiently controlling and managing the batteries, the lifespan of the batteries may be increased, and power may be stably supplied to an external load.

SUMMARY OF THE INVENTION

One or more embodiments of the present invention include a battery system capable of efficiently performing cell balancing, a method of controlling the battery system, and an energy storage system including the battery system.

In accordance with one or more embodiments of the present invention, a method of controlling a battery system having a plurality of batteries includes steps of selecting a battery from the plurality of batteries by using a multiplexer; measuring a voltage of the selected battery; and calculating a charging capacity of the battery based on the measured voltage.

A capacitor is connected to the multiplexer in order to measure the voltage of the selected battery.

In the cell balancing, the battery subject to cell balancing is discharged by using a single resistor.

During the cell balancing, the multiplexer may select only the battery subject to cell balancing.

The performance of cell balancing may be controlled by using a switch.

The battery subject to the cell balancing may have a charging capacity equal to or greater than a reference value.

The cell balancing may include discharging the battery subject to cell balancing such that a charging capacity of the battery subject to cell balancing reaches a charging capacity corresponding to the reference value.

The reference value may be 90% of an average of charging capacities of the plurality of batteries.

In accordance with one or more embodiments of the present invention, a battery system includes a plurality of batteries; a selection circuit unit including a multiplexer that selects a battery from the plurality of batteries; a sensing circuit unit sensing a voltage of the selected battery; a balancing circuit unit performing cell balancing on the selected battery if the selected battery is a battery subject to cell balancing; and a control unit controlling cell balancing by calculating a charging capacity based on the sensed voltage of the plurality of batteries and classifying batteries subject to cell balancing.

The control unit may include a battery selecting unit selecting a battery by controlling the multiplexer; a capacity measuring unit calculating a charging capacity of the battery based on a voltage of the battery selected by the multiplexer; a reference value setting unit setting a cell balancing reference value based on the calculated charging capacity; and a balancing control unit classifying batteries subject to cell balancing based on the calculated charging capacity and the set reference value and controlling cell balancing.

The cell balancing may include discharging the battery subject to cell balancing by using a single resistor.

When performing the cell balancing, the multiplexer may select only the battery subject to cell balancing.

The cell balancing may be controlled by using a switch.

The battery subject to cell balancing may have a charging capacity equal to or greater than the reference value.

The cell balancing may include discharging the battery subject to cell balancing such that a charging capacity of the battery subject to cell balancing reaches a charging capacity corresponding to the reference value.

The reference value may be 90% of an average of charging capacities of the plurality of batteries.

In accordance with one or more embodiments of the present invention, an energy storage system having a battery system which includes a plurality of batteries and connecting the battery system to an external power source to supply power to a load, includes a battery selecting unit selecting a battery by controlling a multiplexer; a capacity measuring unit that measures a voltage of the battery selected by using the multiplexer and calculates a charging capacity of the battery based on the measured voltage; a reference value setting unit that sets a cell balancing reference value based on the charging capacity; and a balancing control unit that classifies batteries subject to cell balancing based on the measured charging capacity and the reference value and performs cell balancing on the classified batteries.

In accordance with the embodiments of the present invention, by reducing the number of cell discharging resistors and the number of sensing capacitors, a charging capacity of batteries may be efficiently measured, and the batteries may perform cell balancing efficiently.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
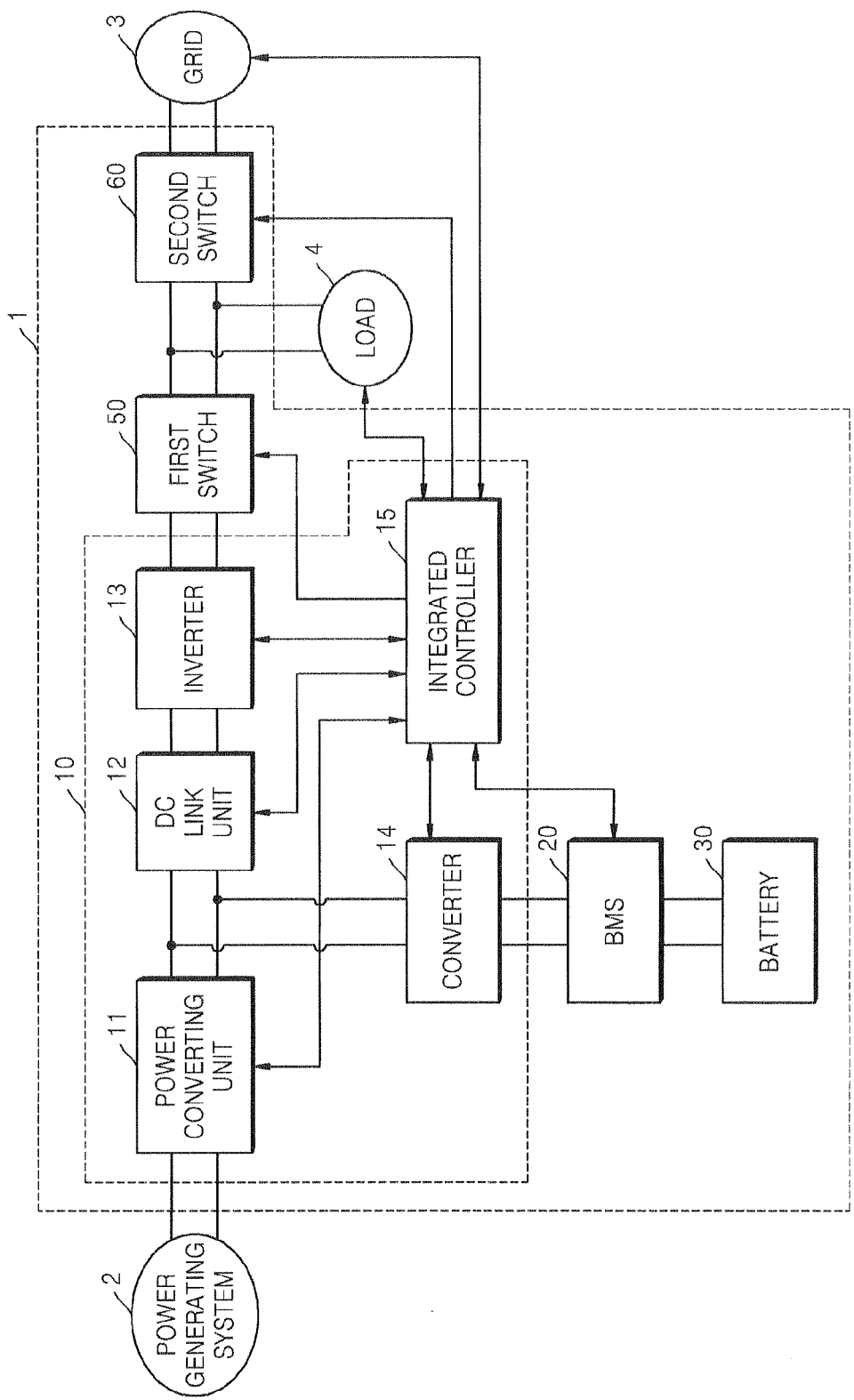
FIG. 1 is a block diagram illustrating an energy storage system constructed with the principle of an embodiment of the present invention.

The present invention will now be described more fully with reference to the accompanying drawings, in which exemplary embodiments of the invention are shown. The embodiments will be described in detail such that one of ordinary skill in the art may easily work the present invention. It should be understood that the embodiments of the present invention may vary but do not have to be mutually exclusive. For example, particular shapes, structures, and properties according to a predetermined embodiment described in this specification may be modified in other embodiments without departing from the spirit and scope of the prevent invention. In addition, positions or arrangement of individual components of each of the embodiments may also be modified without departing from the spirit and scope of the present invention. Accordingly, the detailed description below should not be construed as having limited meanings but construed to encompass the scope of the claims and any equivalent ranges thereto. In the drawings, like reference numerals denote like elements in various aspects.

Hereinafter, the present invention will now be described more fully with reference to the accompanying drawings, in which embodiments of the present invention are shown such that one of ordinary skill in the art may easily work the invention.

FIG. 1 is a block diagram of an energy storage system 1 constructed with an embodiment of the present invention.

Referring to FIG. 1, the energy storage system 1 may be used together with a power generation system 2 and a grid 3 to supply power to a load 4.

The power generation system 2 generates power by using an energy source and supplies the power to the energy storage system 1. Examples of the power generation system 2 may include any power systems that generate power using renewable energy such as a solar power generation system, a wind power generation system, or a tidal power generation system.

The grid 3 includes a power plant, a substation, power lines, and the like. The grid 3 supplies power to the energy storage system 1 so as to supply power to the load 4 and/or a battery 30. Alternatively, the grid 3 may receive power from the energy storage system 1.

The load 4 consumes power generated by the power generation system 2, power stored in the battery 30, or power supplied from the grid 3. A house or a factory may be an example of the load 4.

The energy storage system 1 may store power generated by the power generation system 2 in the battery 30, and supply the generated power to the grid 3. The energy storage system 1 may supply power stored in the battery 30 to the grid 3, or store power supplied from the grid 3 in the battery 30. If there is a power failure in the grid 3, the energy storage system 1 may perform an uninterruptible power supply (UPS) operation.

The energy storage system 1 includes a power conversion system (PCS) 10 that controls power conversion, a battery management system (BMS) 20, the battery 30, a first switch 50, a second switch 60, etc.

The PCS 10 converts the power transmitted from the power generation system 2, the grid 3, and the battery 30 into suitable and desirable power and supplies the converted power to the consumers. The PCS 10 includes a power converting unit 11, a direct current (DC) link unit 12, an inverter 13, a converter 14, and an integrated controller 15.

The power converting unit 11 is connected between the power generation system 2 and the DC link unit 12. The power converting unit 11 delivers power generated by the power generation system 2 to the DC link unit 12. At this time, an output voltage of the power output from the power converting unit 11 is converted into a DC link voltage.

The power converting unit 11 may include a converter, a rectifier circuit, or the like, in dependence upon the type of the power generation system 2. If the power generation system 2 generates DC power, the power converting unit 11 may include a converter for converting the DC power to DC power. If the power generation system 2 generates alternating current (AC) power, the power converting unit 11 may include a rectifier circuit for converting the AC power to DC power. In particular, if the power generation system 2 is a solar power generation system, the power converting unit 11 may include a maximum power point tracking (MPPT) converter so as to obtain maximum power output from the power generation system 2 according to a change in solar radiation, temperature, or the like.

The DC link unit 12 is connected between the power converting unit 11 and the inverter 13. The DC link unit 12 prevents an instantaneous voltage drop of the power generation system 2 or the grid 3 and generation of a peak load in the load 40 so as to maintain a stable DC link voltage.

The inverter 13 is a power converter connected between the DC link unit 12 and the first switch 50. The inverter 13 may include an inverter that converts the DC link voltage output from the power generation system 2 and/or the battery 30 into an AC voltage of the grid 3 and outputs the AC voltage in a discharging mode. The inverter 13 may rectify an AC voltage output from the grid 3 into the DC link voltage and output the same to be stored in the battery 30 in a charging mode. The inverter 13 may be a bidirectional inverter in which directions of input and output are changeable. Alternatively, the inverter 13 may include a plurality of inverters.

The inverter 13 may include a filter for removing harmonics from the AC voltage output to the grid 3, and a phase-locked loop (PLL) circuit for matching a phase of the AC voltage output from the inverter 13 to a phase of the AC voltage of the grid 3. Also, the inverter 13 may perform other functions such as restriction of voltage variation range, power factor correction, removal of DC components, and protection of transient phenomenon.

The converter 14 performs DC-DC conversion by converting a voltage of power output from the battery 30 into a voltage level required by the inverter 13, i.e., the DC link voltage and outputs the same in a discharging mode. Also, the converter 14 performs DC-DC conversion by converting a voltage of power output from the power converting unit 11 or the inverter 13 into a voltage level required by the battery 30, i.e., a charge voltage in a charging mode. The converter 14 may be a bidirectional converter in which directions of input and output are changeable. Alternatively, the converter 14 may include a plurality of converters.

The integrated controller 15 monitors states of the power generation system 2, the grid 3, the battery 30, and the load 4, and controls the power converting unit 11, the inverter 13, the converter 14, the first switch 50, the second switch 60, and the BMS 20 according to results of the monitoring. For example, the integrated controller 15 may monitor whether a power failure occurs in the grid 3, whether the power generation system 2 generates power, an amount of power generated by the power generation system 2, a charge state of the battery 30, an amount of power consumed by the load 4, time, and the like.

The first switch 50 and the second switch 60 are connected in series between the inverter 13 and the grid 3, and control the flow of current between the power generation system 2 and the grid 3 by being turned on or off under the control of the integrated controller 15. The first switch 50 and the second switch 60 may be turned on or off according to states of the power generation system 2, the grid 3, and the battery 30. For example, if a large amount of power is required by the load 40, the first switch 50 and the second switch 60 are both turned on so that all power of the power generation system 2 and the grid 3 may be used. However, if the power of the power generation system 2 and the grid 3 is insufficient to satisfy the required amount of power by the load 4, power stored in the battery 30 may be supplied to the load. If there is a power failure in the grid 3, the second switch 60 is turned off and the first switch 50 is turned on. Accordingly, power from the power generation system 2 and/or the battery 30 may be supplied to the load 4, but may not flow into the grid 3, thereby preventing the energy storage system 1 from operating solely and preventing a worker who works at a power distribution line of the grid 3 or the like from getting an electric shock.

The BMS 20 is connected to the battery 30 and controls charging and discharging of the battery 30 according to a control of the integrated controller 15. The BMS 20 may prevent overcharging, over-discharging, over-current, over-voltage, or over-heating, or the like. To this end, the BMS 20 may monitor a voltage, a current, a temperature, a remaining power amount, a lifespan, a charging state, or the like, and may transmit a monitoring result to the integrated controller 15. In addition, according the current embodiment of the present invention, the BMS 20 may perform cell balancing, which will be described in detail below with reference to FIGS. 2 through 6.

The battery 30 receives power generated by the power generation system 2 or power of the grid 3 and stores the same, and supplies the power stored to the load 4 or the grid 3.

The battery 30 may include at least one battery rack or a plurality of battery racks that are connected serially and/or parallel. A battery rack refers to a sub-component of the battery 30. In addition, each battery rack may include at least one battery tray or a plurality of battery trays that are connected serially and/or parallel. A battery tray refers to a sub-component of the battery rack. Also, each battery tray may include a plurality of battery cells. The battery 30 may be formed of various types of battery cells such as a nickel-cadmium battery, a lead storage battery, a NiMH: nickel metal hydride (NoMH) battery, a lithium ion battery, or a lithium polymer battery.

Figure 2:
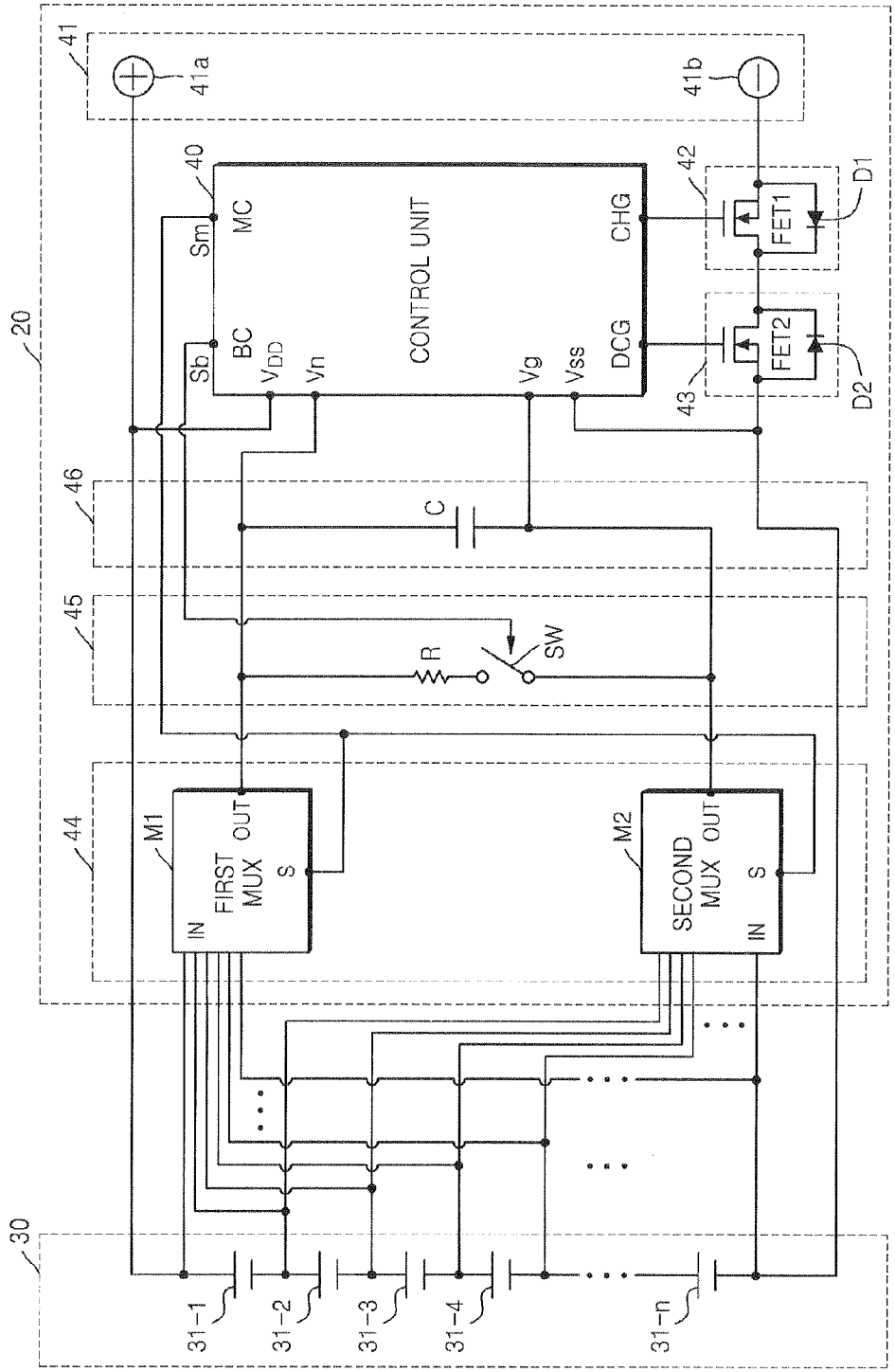
FIG. 2 is an exemplary circuit diagram illustrating a battery and a control unit constructed with the principle of an embodiment of the present invention.

FIG. 2 is an exemplary circuit diagram illustrating the battery 30 and the BMS 20 constructed with an embodiment of the present invention. Hereinafter, the battery 30 and the BMS 20 together will be referred as a battery system.

The battery 30 may include at least one of battery cells or battery trays 31-1, ..., 31-n. The battery 30 may be connected to the BMS 20 and supply power to the outside or receive external power. When the battery 30 is used in the energy storage system 1, battery cells or battery trays 31-1, ..., 31-n may be included. In FIG. 2, for convenience of description, the battery 30 of the energy storage system 1 is shown to include the battery cells 31-1, ..., 31-n, and the battery cells 31-1, ..., 31-n will be defined as a plurality of battery cells. The battery cells 31-1, ..., 31-n may be extended to a plurality of battery trays or a plurality of battery racks.

The BMS 20 controls charging or discharging of the battery 30, and controls every portion of the battery system so that the battery system may operate stably. The BMS 20 may include a control unit 40, a terminal unit 41, a charging control switch 42, a discharging control switch 43, a selection circuit unit 44, a balancing circuit unit 45, and a sensing circuit unit 46.

The terminal unit 41 includes at least a positive terminal 41a and a negative electrode terminal 41b. Power stored in the battery 30 may be supplied to the outside through the terminal unit 41. Alternatively, external power may be supplied to the battery 30 through the terminal unit 41 to charge the battery 30. When the battery 30 is used in a mobile device, the terminal unit 41 may be connected to the mobile device or a charger. When the battery 30 is used in the energy storage system 1, the terminal unit 41 may be connected to the converter 14 for power conversion or to another battery tray.

The control unit 40 controls charging or discharging of the battery 30 by sensing a charging state or a discharging state of the battery 30 or a current flow in the battery system. The control unit 40 may include a power terminal VDD, a ground terminal VSS, a charging control terminal CHG, a discharging control terminal DCG, a multiplexer (MUX) control terminal MC, a voltage measuring terminal Vn, a voltage measurement base terminal Vg, and a balancing control terminal BC.

A power voltage and a ground voltage are applied to the power terminal VDD and the ground terminal VSS, respectively. The charging control terminal CHG and the discharging control terminal DCG output a charging control signal to control an operation of the charging control switch 42 or a discharging control signal to control an operation of the discharging control switch 43.

The MUX control terminal MC may output a signal used to measure a voltage in the battery system or to select a battery cell to which cell balancing is to be performed. The signal output from the MUX control terminal MC may be applied to both a first MUX M1 and a second MUX M2. While the MUX control terminal MC is illustrated as one element in FIG. 2 for clarity of illustration, the number thereof is not limited thereto but may be determined according to the number of battery cells. That is, if there are n battery cells, $2^n$ of the MUX control terminals MC may be included.

The voltage measuring terminal Vn and the voltage measurement base terminal Vg measure a voltage of each of the battery cells 31-1, ..., 31-n included in the battery 30. That is, the voltage measuring terminal Vn and the voltage measurement base terminal Vg measure a voltage of each of the battery cells 31-1, ..., 31-n that is selected by the first and second MUXes M1 and M2 by using a capacitor C included in the sensing circuit unit 46. The measured voltage corresponds to a difference between voltages of the voltage measuring terminal Vn and the voltage measurement base terminal Vg. The measured voltage of the battery cells 31-1, ..., 31-n is converted into an electrical signal and may be transmitted as voltage data Dv to a capacity measuring unit 22 which will be described below (see FIG. 3 or 5).

The balancing control terminal BC outputs a balancing control signal Sb to turn on or off a switch SW included in the balancing circuit unit 45. The balancing control terminal BC turns on or off the switch SW such that a battery cell subject to cell balancing is discharged by an amount corresponding to a reference value which is to be described below. Also, when the first and second MUXes M1 and M2 select battery cells 31-1, . . . , 31-n as the balancing control terminal BC turns on or off the switch SW, the balancing control terminal BC may control such that cell balancing is performed only to those battery cells 31-1, . . . , 31-n that are subject to cell balancing.

The charging control switch 42 and the discharging control switch 43 may be formed of a field-effect transistor (FET) and a parasitic diode, respectively. That is, the charging control switch 42 includes a FET FET1 and a parasitic diode D1, and the discharging control switch 43 includes a FET FET2 and a parasitic diode D2. A contact direction between a source and a drain of the FET FET1 of the charging control switch 42 is set in an opposite direction to that between a source and a drain of the FET FET2 of the discharging control switch 42. The FET FET1 and the FET FET2 of the charging control switch 42 and the discharging control switch 43 are switching devices, but the embodiments of the present invention are not limited thereto. Alternatively, electrical devices performing different types of switching may be used as the FETs. For example, when the battery 30 is used in the energy storage system 1, a large current may flow through a high current path; therefore, a relay may be used in this case.

The selection circuit unit 44 is a circuit that electrically connects the balancing circuit unit 45 or the sensing circuit unit 46 to one of the battery cells 31-1, . . . , 31-n so as to form a loop. The selection circuit unit 40 may include the first MUX M1 and the second MUX M2. In regard to the electrical configuration and function of the first MUX M1 and the second MUX M2, details of typical multiplexers that are known in the art may be referred.

The selection circuit unit 40 may allow the balancing circuit unit 45 or the sensing circuit unit 46 to be selectively connected to a battery cell. Accordingly, instead of including the balancing circuit unit 45 or the sensing circuit unit 46 for each of the battery cells 31-1, . . . , 31-n, either the balancing circuit unit 45 or the sensing circuit unit 46 may measure voltages of all of the battery cells 31-1, . . . , 31-n or perform cell balancing. Thus, a volume of circuits may be reduced and efficiency of cell balancing process may be increased.

The first MUX M1 and the second MUX M2 of the selection circuit unit 40 may include a selection terminal S that receives a battery selection signal from the control unit 40. While the MUX control terminal MC is illustrated as one element in FIG. 2 for clarity of illustration, the number thereof is not limited thereto but may be determined according to the number of battery cells. That is, if there are n battery cells, $2^n$ of the MUX control terminals MC may be included.

The balancing circuit unit 45 compulsively discharges at least one of the battery cells 31-1, . . . , 31-n in order to balance a charging amount of the battery cells 31-1, . . . , 31-n. The balancing circuit unit 45 may include the switch SW and a resistor R. The balancing circuit unit 45 turns on the switch SW when a battery cell subject to cell balancing is selected by the selection circuit unit 44 according to a balancing control signal Sb from the control unit 40 to form a loop with respect to a predetermined battery cell. Accordingly, the battery cell subject to cell balancing is discharged by itself, and cell balancing is performed thereby.

The sensing circuit unit 46 may measure a voltage of the battery cells 31-1, . . . , 31-n. The sensing circuit unit 46 may include a capacitor C. In one embodiment, the sensing circuit unit 46 may include a single capacitor C. The sensing circuit unit 46 forms a loop such that a predetermined battery cell among the battery cells 31-1, . . . , 31-n selected by the selection circuit unit 44 is connected to the capacitor C in the sensing circuit unit 46. A measured voltage of the predetermined battery cell, with which the capacitor C has formed the loop, is transmitted to the control unit 40.

Hereinafter, cell voltage sensing and cell balancing of the control unit 40 according to an embodiment of the present invention will be described.

Figure 3:
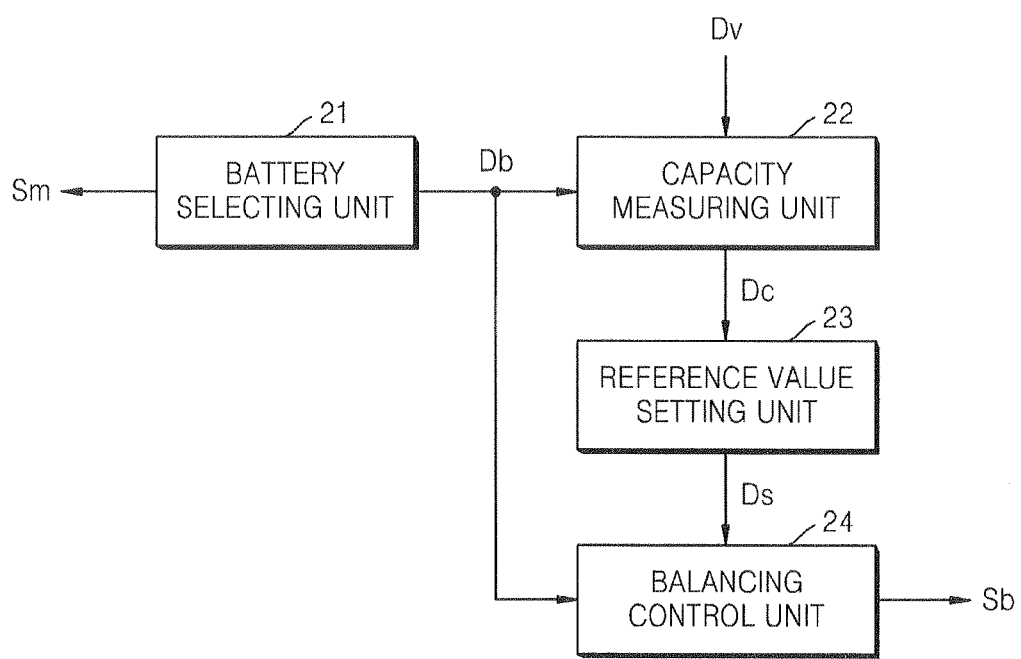
FIG. 3 is a block diagram illustrating a portion of a control unit constructed with the principle of an embodiment of the present invention.

FIG. 3 is a block diagram illustrating a portion of the control unit 40 constructed with an embodiment of the present invention.

Referring to FIG. 3, the control unit 40 may include a battery selecting unit 21, a capacity measuring unit 22, a reference value setting unit 23, and a balancing control unit 24.

The battery selecting unit 21 selects a battery cell, with which the balancing circuit unit 45 or the cell circuit unit 46 is to form a loop, from all the battery cells 31-1, . . . , 31-n. The battery selecting unit 21 generates a MUX control signal Sm so that the first MUX M1 and the second MUX M2 may select a battery cell, and the generated MUX control signal Sm is transmitted to the selection circuit unit 44 via the MUC control terminal MC. A battery cell may be selected sequentially from an end of the battery 30 or according to a particular algorithm. A battery cell selected by the battery selecting unit 21 may be electrically connected to the balancing circuit unit 45 or the sensing circuit unit 46 by using the first MUX M1 and the second MUX M2, and the battery selecting unit 21 transmits data Db representing the selected battery cell to the capacity measuring unit 22 and the balancing control unit 24.

The capacity measuring unit 22 receives data Db representing the battery cell selected by the battery selecting unit 21 and data Dv representing the voltage of the selected battery cell via the voltage measuring terminal Vn and the voltage measurement base terminal Vg. The capacity measuring unit 22 calculates a charging capacity of each of the battery cells 31-1, . . . , 31-n based on the information of the selected battery cell and the received voltage data Dv. The capacity measuring unit 22 transmits the calculated charging capacity data Dc to the reference value setting unit 23.

The reference value setting unit 23 calculates a charging capacity reference value regarding which cell balancing is required, among charging capacities of the battery cells. The charging capacity reference value, regarding which cell balancing is required, refers to a predetermined charging capacity value that is set as a reference value for cases in which there is a difference between charging capacities of battery cells, and the battery cells having charging capacities greater than the predetermined charging capacity reference value are discharged in order to prevent the charging capacity difference from affecting the capacity and lifespan of all the battery cells. That is, the battery cells having a higher charging capacity than the reference are subject to cell balancing.

Various methods may be used to set the charging capacity reference value. For example, the charging capacity reference value may be 90% of an average of charging capacities of the battery cells 31-1, . . . , 31-n included in the battery 30. In this case, the cell balancing may be performed to all of the battery cells of which a charging capacity is over 90% of the average. In this case, the charging capacities of the batteries may be different after the cell balancing is performed.

Alternatively, the reference value may be a charging capacity of a battery cell having the smallest charging capacity among the battery cells 31-1, . . . , 31-*n* included in the battery 30. In this case, cell balancing is performed to the rest of n-1 battery cells, and all of the battery cells may have the same charging capacities after the cell balancing is performed.

Alternatively, 90% of an average of charging capacities of abnormal battery cells among the battery cells 31-1, . . . , 31-*n* included in the battery 30, from which, for example, the defect battery cells are excluded, may be set as the reference value. This embodiment is suitable for cases in which the abnormal battery cells are replaceable.

The reference value setting unit 23 may transmit a signal Ds representing the set charging capacity reference value to the balancing control unit 24.

The balancing control unit 24 classifies those battery cells having a higher charging capacity than the charging capacity reference value as battery cells subject to cell balancing. The cell balancing control unit 24 generates a balancing control signal Sb for discharging the classified battery cells subject to cell balancing. When the switch SW of the balancing circuit unit 45 is turned on by the balancing control signal Sb, cell balancing is performed to the classified battery cells.

In one embodiment, the cell balancing refers to a process of discharging the battery cell which has a charging capacity equal to or higher than the predetermined charging capacity reference value until the charging capacity of the battery cell reaches the charging capacity reference value.

Hereinafter, a control method performed by using the control unit 40 according to an embodiment of the present invention will be described.

Figure 4:
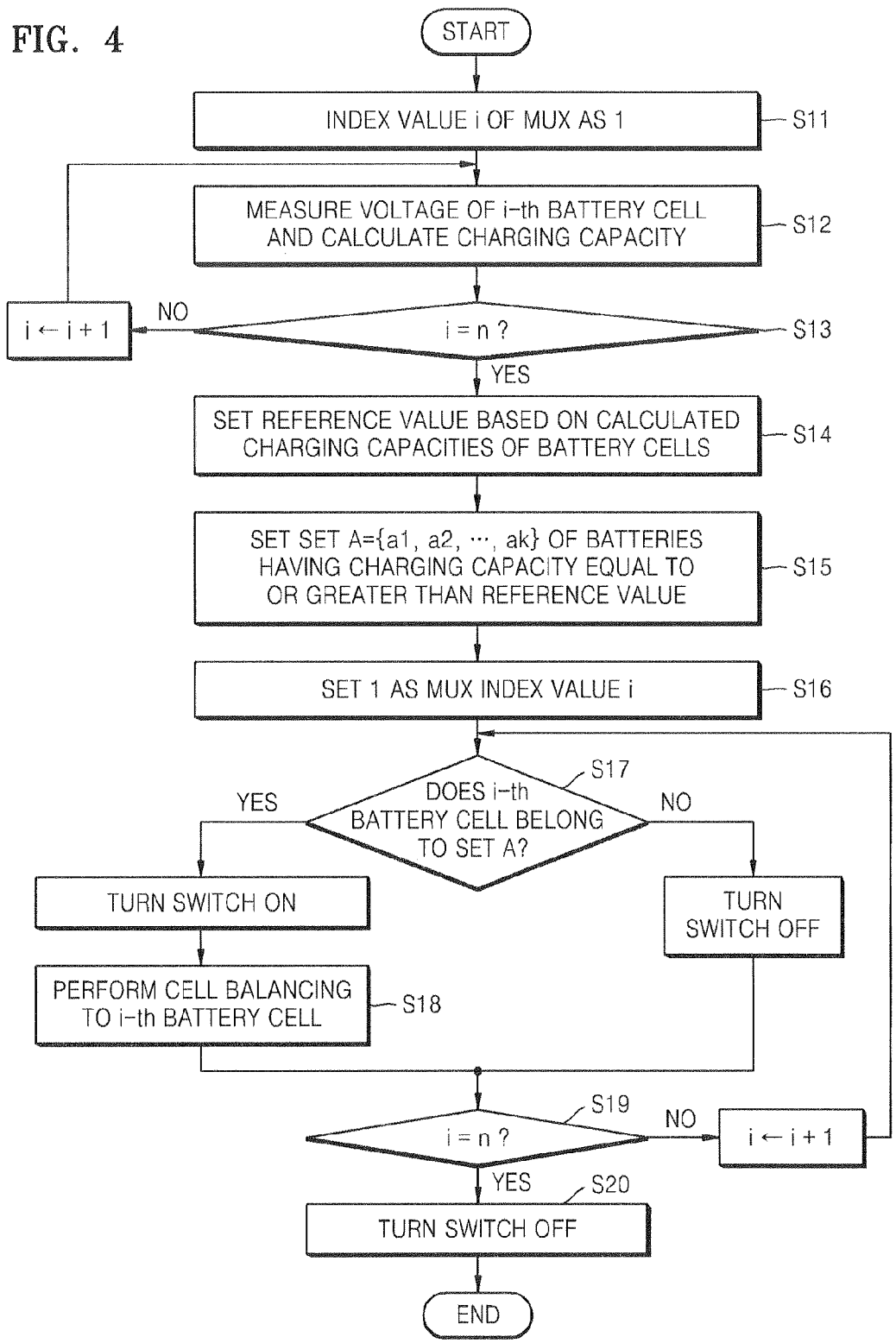
FIG. 4 is a flowchart illustrating a control method performed using a control unit, according to an embodiment of the present invention.

FIG. 4 is a flowchart illustrating a control method performed by using the control unit 40, according to an embodiment of the present invention.

Referring to FIG. 4, in the first operation step S11, the control unit 40 sets 1 as an index value of the first MUX M1 and the second MUX M2. The index value of the first MUX M1 or the second MUX M2 refers to the number of a battery cell selected by the first MUX M1 or the second MUX M2 inside in order to electrically connect the battery 30 and the balancing circuit unit 45 or the sensing circuit unit 46 inside. That is, according to the current embodiment of the present invention, if the index value of the first MUX M1 or the second MUX M2 is 1, a first battery cell 31-1 may be selected, and if the index value of the first MUX M1 or the second MUX M2 is 2, a second battery cell 31-2 may be selected, and if the index value is n, an n-th battery cell 31-*n* may be selected.

In the second operation step S12, the capacity measuring unit 22 of the control unit 40 measures a voltage of a selected battery cell corresponding to the index value of the first MUX M1 or the second MUX M2 and calculates a charging capacity thereof. The capacity measuring unit 22 transmits charging capacity data Dc of the selected battery cell to the reference value setting unit 23.

In the third operation step S13, whether the index value i of the first MUX M1 or the second MUX M2 is identical to n is determined. If the index value i of the first MUX M1 or the second MUX M2 equals to n, the method proceeds to a next operation. If the index value i of the first MUX M1 or the second MUX M2 is different from n, that is, if the sequential voltage measurement of all of the battery cells is not completed, the value of i is increased by 1 and the operation. S12 is repeated and a voltage of a next battery cell is measured.

In the fourth operation step S14, the reference value setting unit 23 determines a charging capacity reference value based on the measured charging capacities of the battery cells 31-1, . . . , 31-*n*.

In the fifth operation step S15, the reference value and the measured charging capacities of the battery cells 31-1, . . . , 31-*n* are compared, and battery cells having a charging capacity equal to or higher than the reference value are classified as battery cells subject to cell balancing. In operation S15, a set of the numbers of the classified battery cells may be group as set A={a1, a2, . . . , ak} for convenience.

In the sixth operation step S16, 1 is set as the index value i of the first MUX M1 or the second MUX M2 again in order to sequentially perform cell balancing from the first battery cell 31-1.

In the seventh operation step S17, whether the index value i of the first MUX M1 or the second MUX M2 is in the set A of the battery cells subject to cell balancing.

If the index value i belongs to the set A, the switch SW of the balancing circuit unit 45 is turned on, and cell balancing is performed to an i-th battery cell in step S18. On the contrary, if the index value i does not belong to the set A, the switch SW is turned off so as to prevent discharging of the i-th battery cell.

In the ninth operation step S19, whether i corresponds to n is determined. If i does not equal to n, the value of i is increased by 1 and the operation S17 is repeated. If i equals to n, that is, if cell balancing is completed with respect to all of the battery cells subject to cell balancing, the switch SW is turned off in operation S20 thereby ending the cell balancing.

In reference to FIGS. 3 and 4, the control unit 40 sequentially selects battery cells by using the first MUX M1 or the second MUX M2 to measure a voltage of each of the battery cells, and then connects the sequentially selected battery cells to a discharging resistor R and turns on the switch SW for those battery cells having a charging capacity higher than the reference value so as to perform cell balancing to those battery cells having a charging capacity higher than the reference value.

Figure 5:
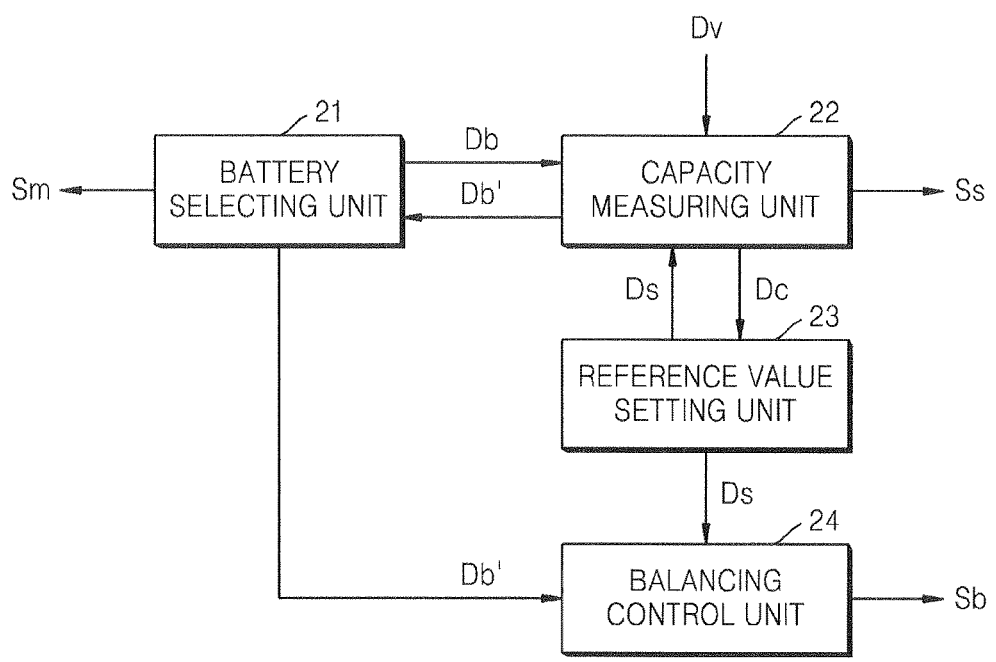
FIG. 5 is a block diagram illustrating a portion of a control unit constructed with the principle of another embodiment of the present invention.

FIG. 5 is a block diagram illustrating a portion of the control unit 40 according to another embodiment of the present invention.

Referring to FIG. 5, the control unit 40 may include a battery selecting unit 21, a capacity measuring unit 22, a reference value setting unit 23, and a balancing control unit 24.

Figure 6:
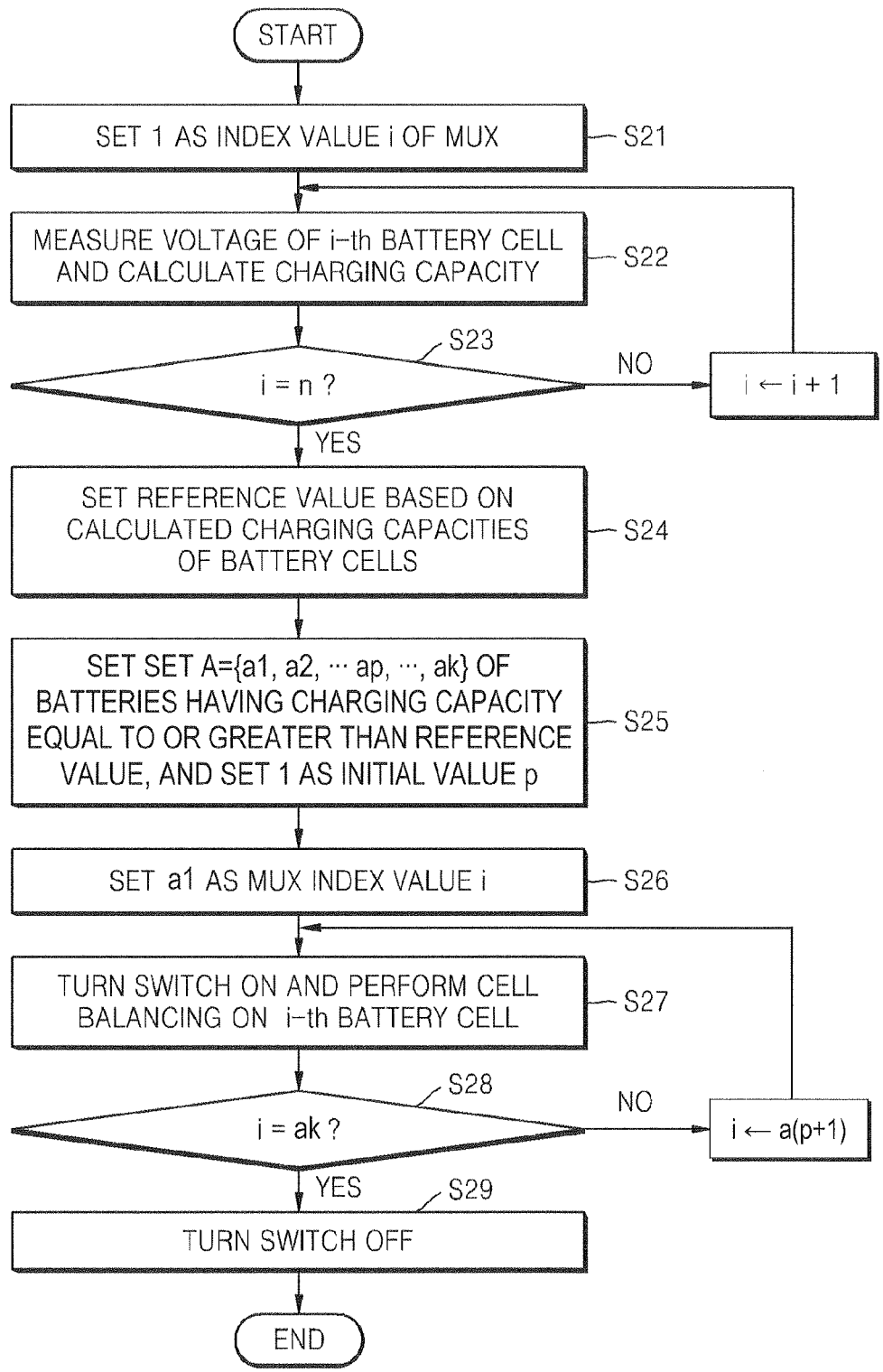
FIG. 6 is a flowchart illustrating a control method performed using a control unit, according to another embodiment of the present invention.

The current embodiment of the present invention which will be described with reference to FIGS. 5 and 6 is a modified embodiment described with reference to FIGS. 3 and 4. Thus, descriptions of repeated elements will be omitted.

In reference to FIG. 5, the battery selecting unit 21 transmits to the selection circuit unit 44 a MUX control signal Sm for selecting a battery cell that is to be connected to the balancing circuit unit 45 or the sensing circuit unit 46, and transmits a signal Db including data representing the selected battery cell to the capacity measuring unit 22.

The capacity measuring unit 22 receives the data Db representing the selected battery cell and voltage data Dv representing the voltage of the selected battery cell and transmits charging capacity data Dc of the selected battery cell to the reference value setting unit 23.

The reference value setting unit 23 obtains and collects charging capacity data Dc of each battery cell to set a reference value which is used to classify the battery cells subject to cell balancing. The capacity measuring unit 22 determines and transmits the selection data Db' representing the battery cells for which cell balancing is required, based on the reference value data Ds transmitted from the reference value setting unit 23.

Since the battery selecting unit 21 has received the selection data Db' representing the battery cells for which cell balancing is required, during the process of cell balancing, the first MUX M1 or the second MUX M2 does not have to select all the battery cells and the balancing control unit 24 does not have to selectively turn on and off the switch as in the previous embodiment of the present invention. In the current embodiment, during the process of cell balancing, the switch may be maintained at an on state and only those battery cells included in the selection data Db' to perform cell balancing are selected by the first MUX M1 or the second MUX MS. When the cell balancing is completed, the switch is then turned off.

That is, the battery selecting unit 21 may allow only those battery cells requiring cell balancing to be selectively connected to the first MUX M1 or the second MUX M2, and the balancing control unit 24 may generate a signal Sb for performing cell balancing on the selected battery cells at an amount corresponding to the reference value without having to additionally determine whether the battery cells are subject to cell balancing or not and to control the switch SW.

Hereinafter, a control method performed using the control unit 40 according to the current embodiment of the present invention will be described.

FIG. 6 is a flowchart illustrating a control method performed using the control unit 40, according to another embodiment of the present invention.

In reference to FIG. 6, in the first operation step S21, the control unit 40 sets 1 as an index value of the first MUX M1 or the second MUX M2. If the index value is 1, a first battery cell 31-1 is connected to the balancing circuit unit 45 or the sensing circuit unit 46 via the first MUX M1 or the second MUX M2.

In the second operation step S22, the control unit 40 measures a voltage of each of the battery cells 31-1, . . . , 31-$n$ selected by the first MUX M1 or the second MUX M2 via the voltage measuring terminal Vn and the voltage measurement base terminal Vg and calculates a charging capacity of each of the battery cells 31-1, . . . , 31-$n$ based on voltage values measured by using the capacity measuring unit 22.

In the third operation step S23, if the index value i equals to n and a voltage is sensed from all n battery cells, the method proceeds to a next operation to perform cell balancing; if the index value i is less than n, the index value i is increased by 1 and a voltage of the rest of the battery cells is measured in operation S23.

In the fourth operation step S24, the reference value setting unit 23 calculates and sets a reference value based on the measured charging capacities of the battery cells, and battery cells having a charging capacity equal to or higher than the reference value are classified as battery cells subject to cell balancing.

In the fifth operation step S25, a set of the numbers of the classified battery cells may be grouped as set A={a1, a2, . . . ap, . . . , ak} for convenience.

In sixth operation step S26, an index value i of the first MUX M1 or the second MUX M2 is set as ap. An initial value of ap is a1, that is, the number of a first battery cell which is subject to cell balancing.

In the seventh operation step S27, if the first MUX M1 or the second MUX M2 selects the ap-th battery cell, the balancing control unit 24 turns on the switch SW and performs cell balancing on the ap-th battery cell.

In the eighth operation step S28, a(p+1) is applied to the index value i of the first MUX M1 or the second MUX M2 so that the first MUX M1 or the second MUX M2 may sequentially select battery cells subject to cell balancing, included in the set A.

In the ninth operation step S29, when the index value equals to ak, which represents the last battery cell subject to cell balancing, cell balancing is finished and the switch SW is turned off to end the cell balancing.

That is, unlike the embodiment of FIGS. 3 and 4, according to the current embodiment of the present invention of FIGS. 5 and 6, when cell balancing is performed, the first MUX M1 or the second MUX M2 selects only battery cells that are subject to cell balancing. Thus, the switch SW is used only in adjusting a discharging amount.

As described above, according to a battery system, a method of controlling the battery system, and an energy storage system including the battery system of embodiments of the present invention, a volume of circuits may be reduced but cell balancing may be efficiently performed.

While the present invention has been particularly shown and described with reference to exemplary embodiments thereof, it will be understood by those of ordinary skill in the art that various changes in form and details may be made therein without departing from the spirit and scope of the present invention as defined by the following claims. The embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of controlling a battery system comprising a plurality of batteries, the method comprising:
    classifying batteries subject to cell balancing from the plurality of batteries by a control unit, the classified batteries subject to cell balancing having a charging capacity equal to or greater than a reference value which is calculated by the control unit based on a charging capacity of each of the plurality of batteries;
    selecting a battery from the plurality of batteries by using a multiplexer; and
    when the battery selected by the multiplexer is subject to cell balancing, performing cell balancing on the selected battery by a balancing circuit unit,
    wherein the cell balancing comprises discharging the battery subject to cell balancing such that the charging capacity of the battery subject to cell balancing reaches a charging capacity corresponding to the reference value.

2. The method of claim 1, further comprising:
    measuring a voltage of the selected battery by the control unit; and
    calculating the charging capacity of each of the plurality of batteries based on the measured voltage by the control unit.

3. The method of claim 2, wherein in the measure of the voltage of the selected battery, a capacitor is electrically connected to the multiplexer.

4. The method of claim 1, wherein the cell balancing comprises discharging the battery subject to cell balancing by using a single resistor.

5. The method of claim 1, wherein the multiplexer selects only the battery subject to cell balancing.

6. The method of claim 1, wherein the performance of cell balancing is controlled by using a switch.

7. The method of claim 1, wherein the reference value is 90% of an average of the charging capacities of the plurality of batteries.

8. A battery system, comprising:
- a plurality of batteries;
- a selection circuit unit comprising a multiplexer that selects a battery from the plurality of batteries;
- a sensing circuit unit measuring a voltage of the selected battery;
- a balancing circuit unit performing cell balancing on the selected battery if the selected battery is determined subject to cell balancing; and
- a control unit controlling cell balancing by calculating charging capacities of the batteries based on the measured voltage of the plurality of batteries, and by classifying batteries subject to cell balancing having a charging capacity equal to or greater than a charging capacity reference value which is calculated by the control unit based on the calculated charging capacities of the batteries,
- wherein the cell balancing comprises discharging the battery subject to cell balancing such that the charging capacity of the battery subject to cell balancing reaches a charging capacity corresponding to the charging capacity reference value.

9. The battery system of claim 8, wherein the control unit comprises:
- a battery selecting unit selecting a battery by controlling the multiplexer;
- a capacity measuring unit calculating the charging capacity of each of the plurality of batteries based on the voltage of the battery selected by the multiplexer;
- a reference value setting unit determining the charging capacity reference value based on the charging capacity calculated by the capacity measuring unit; and
- a balancing control unit controlling cell balancing by classifying the batteries subject to cell balancing based on the calculated charging capacity and the determined charging capacity reference value.

10. The battery system of claim 9, wherein the cell balancing comprises discharging the battery subject to cell balancing by electrically connecting a single resistor to the battery.

11. The battery system of claim 9, wherein when performing the cell balancing, the multiplexer selects only the batteries subject to cell balancing.

12. The battery system of claim 9, wherein the cell balancing is controlled using a switch.

13. The battery system of claim 8, wherein the reference value is 90% of an average of charging capacities of the plurality of batteries.

14. An energy storage system comprising a battery system including a plurality of batteries and connecting the battery system to an external power source to supply power to a load, the energy storage system comprising:
- a battery selecting unit that selects a battery by using a multiplexer;
- a capacity measuring unit that measures a voltage of the battery selected by using the multiplexer and calculates a charging capacity of the battery based on the measured voltage;
- a reference value setting unit that determines a charging capacity reference value which is calculated based on the charging capacity of each of the plurality of batteries; and
- a balancing control unit classifying batteries subject to cell balancing having a charging capacity equal to or greater than the charging capacity reference value, the balancing control unit controlling cell balancing on the classified batteries,
- wherein the cell balancing comprises discharging the battery subject to cell balancing such that the charging capacity of the battery subject to cell balancing reaches a charging capacity corresponding to the charging capacity reference value.

\* \* \* \* \*